US010831194B2

(12) United States Patent
Stefan et al.

(10) Patent No.: US 10,831,194 B2
(45) Date of Patent: Nov. 10, 2020

(54) METHOD AND DEVICE THAT RECOGNIZES ROAD USERS IN AN ENVIRONMENT OF A VEHICLE

(71) Applicant: FORD GLOBAL TECHNOLOGIES, LLC, Dearborn, MI (US)

(72) Inventors: Frederic Stefan, Aachen (DE); Christoph Arndt, Moerlen (DE); Uwe Gussen, Huertgenwald (DE)

(73) Assignee: Ford Global Technologies, LLC, Dearborn, MI (US)

( * ) Notice: Subject to any disclaimer, the term of this patent is extended or adjusted under 35 U.S.C. 154(b) by 351 days.

(21) Appl. No.: 16/037,540

(22) Filed: Jul. 17, 2018

(65) Prior Publication Data

US 2019/0033864 A1 Jan. 31, 2019

(30) Foreign Application Priority Data

Jul. 25, 2017 (DE) .......................... 10 2017 212 701

(51) Int. Cl.
*G05D 1/00* (2006.01)
*G06K 9/00* (2006.01)
(Continued)

(52) U.S. Cl.
CPC .......... *G05D 1/0088* (2013.01); *G06F 16/27* (2019.01); *G06F 16/5854* (2019.01); *G06K 9/00805* (2013.01); *G06K 9/325* (2013.01); *G06T 7/20* (2013.01); *G05D 2201/0213* (2013.01); *G06K 2209/01* (2013.01); *G06T 2207/10016* (2013.01); *G06T 2207/10048* (2013.01);
(Continued)

(58) Field of Classification Search
CPC .......... G05D 1/0088; G05D 2201/0213; G06F 16/27; G06F 16/5854; G06K 2209/01; G06K 9/00805; G06K 9/325; G06T 2207/10016; G06T 2207/10048; G06T 2207/10052; G06T 2207/30261; G06T 7/20
See application file for complete search history.

(56) References Cited

U.S. PATENT DOCUMENTS 9,734,455 B2 * 8/2017 Levinson .............. G01S 17/931
2016/0231746 A1 * 8/2016 Hazelton ............... B60W 30/00

FOREIGN PATENT DOCUMENTS

DE 102008062915 A1 7/2010
DE 102013020435 A1 6/2014
(Continued)

*Primary Examiner* — Manuchehr Rahmjoo
(74) *Attorney, Agent, or Firm* — Frank Lollo; Brooks Kushman P.C.

(57) ABSTRACT

The disclosure relates to a method and to a device that recognizes road users in an environment of a vehicle. The vehicle includes at least one camera-based sensor that acquires images of the vehicle environment, wherein the device implements the method to process the images. The method includes acquiring at each of a plurality of different times, an image of an object located in the vehicle environment, performing image analyses on the images acquired at different times, and deciding, based on a result of the image analyses performed, whether the object shall be interpreted as a road user or as an inanimate entity. The device implements the method to control an autonomous driving system to control vehicle movements based on the result.

13 Claims, 2 Drawing Sheets

(51) Int. Cl.
*G06T 7/20* (2017.01)
*G06F 16/27* (2019.01)
*G06F 16/583* (2019.01)
*G06K 9/32* (2006.01)

(52) U.S. Cl.
CPC .............. *G06T 2207/10052* (2013.01); *G06T 2207/30261* (2013.01)

(56) References Cited

FOREIGN PATENT DOCUMENTS

| | | |
|---|---|---|
| DE | 102013219038 A1 | 3/2015 |
| DE | 102015118067 A1 | 4/2016 |

\* cited by examiner

METHOD AND DEVICE THAT RECOGNIZES ROAD USERS IN AN ENVIRONMENT OF A VEHICLE

CROSS-REFERENCE TO RELATED APPLICATIONS

This application claims foreign priority benefits under 35 U.S.C. § 119(a)-(d) to DE Application 10 2017 212 701.5 filed Jul. 25, 2017, which is hereby incorporated by reference in its entirety.

TECHNICAL FIELD

The disclosure relates to a method and a device that recognizes road users in an environment of a vehicle.

BACKGROUND

As the development of autonomous-driving systems advances, it is becoming increasingly important for proper operation of these systems such that other road users, in particular pedestrians, are recognized or identified accurately. For instance, a vehicle equipped with an autonomous-driving system, and moving in an urban area must recognize a pedestrian crossing a road in order that a driving speed can be reduced, or sudden braking can be actuated, if the pedestrian comes very close to the vehicle.

Autonomous-driving systems in which objects or road users are recognized on the basis of camera systems (e.g. lidar cameras) are known in the prior art. The other road users in question may be other vehicles, cyclists or pedestrians.

DE 10 2013 020 435 A1 discloses, inter alia, a method that recognizes objects in a vehicle environment using an image acquisition device, in which method, a coarse classification of the objects is performed in a first step, and a fine classification is performed in a second step on the basis of at least one additional object feature. In particular, for objects recognized as pedestrians in the coarse classification, a fine classification is performed on the basis of a mobility of the pedestrians, for which purpose, movements of the pedestrians are detected and analyzed in order to identify, for example, children, adults or older people.

With regard to the further prior art, reference is made to DE 10 2015 118 067 A1.

Despite the various known approaches to recognizing and identifying pedestrians using camera-based sensors, problems can arise in practice from that pedestrians, animals or bicycles may be depicted on numerous advertising surfaces (which may exist, for instance, in the form of billboards, on trucks or at bus stops), with a result that conventional image processing algorithms are accordingly misled. For instance, an image processing algorithm may incorrectly interpret a pedestrian depicted on an advertising poster at a bus stop as a real pedestrian intending to cross a road. An autonomous-driving system based on such an image processing algorithm may use a corresponding mis-assessment as reason to initiate sudden braking or evasive action, or bring the vehicle to a stop in a middle of the road, depending on a vehicle speed and a position of the advertisement. In this case, a behavior of the vehicle concerned would be incomprehensible to vehicle occupants and a surprise to other road users (in particular the traffic located behind the vehicle), with the latter possibly forced to perform a sudden braking action on their part in order to avoid a collision.

SUMMARY

An object of the present disclosure is to provide a method and a device that recognizes road users in an environment of a vehicle, which allow recognition to be as reliable as possible while reducing a risk of misinterpretations of the environment.

A method according to the disclosure that recognizes road users in the environment of a vehicle, which vehicle comprises at least one camera-based sensor that acquires images of the vehicle environment, comprises the following steps:
  acquiring at each of a plurality of different times, an image of an object located in the vehicle environment;
  performing image analyses on the images acquired at different times; and
  making a decision, on the basis of a result of the image analyses performed, whether object shall be interpreted as a road user or as an inanimate entity.

According to one embodiment, in the step of performing image analyses, the method and device ascertain whether any two images of an object that are acquired at consecutive times can be transformed into each other by applying a similarity transformation.

In the context of the present application, a similarity transformation is understood to mean a transformation or geometrical transformation that constitutes or includes stretching (i.e. enlarging or reducing by a scaling factor), translation, rotation, reflection or any combination of the aforementioned transformations.

The disclosure is based here on the consideration that "true" road users such as pedestrians, cyclists or animals perform complex motion sequences that, in each case, involve most parts of a body (e.g. arms, legs and head). From an image processing perspective, a "true" road user with complex motion sequences means that a real pedestrian, unlike a time-invariant image of a pedestrian, produces a certain variation in a displayed or recognized pattern that indicates that a real moving object or living being is involved. In contrast, although an image of an inanimate entity, e.g. on an advertising poster, from a moving vehicle can look very different in each vehicle position because of vehicle movement, in this case, as explained later, there are still similarity relationships that are unlikely for a real pedestrian.

According to the disclosure, images of objects such as pedestrians, for instance, in particular can be analyzed over a specific time window. An attempt is made to ascertain a similarity transformation, or similarity relationship between respective images. In the similarity transformation, the device or method ascertains, in particular whether a particular image of the object (e.g. of a pedestrian) can be generated by a combination of stretching, translation, rotation and reflection from an image acquired at an earlier time. If this is the case, the object or the pedestrian can be classified, via the device or method, as an inanimate entity, or, respectively, as a pedestrian who is not real (an "artificial" pedestrian).

In another embodiment, the method or the device according to the disclosure can also identify specific markers in an image of the pedestrian that is produced by a camera. In particular, these markers may be letters or logos that constitute typical features of advertisements. In this process, it is also possible to access a database held in a Cloud memory, which database comprises a collection of known advertisements, logos, fonts used in advertising, etc., whereby data processing according to the disclosure can be made faster and simpler. In addition, suitable image processing algorithms such as character recognition algorithms or object recognition algorithms, for instance, can be used.

According to one embodiment, in a step of performing image analyses, the device or method checks whether images acquired at different times exhibit at least one feature indicating an existence of an advertisement.

According to one embodiment, the check of images acquired at different times is performed, via the device or method, with access to at least one database, in particular to a database stored in a Cloud memory.

According to one embodiment, the check of images acquired at different times comprises running at least one character recognition algorithm or object recognition algorithm.

According to one embodiment, the method also comprises analyzing an infrared signature of the object, wherein the device decides whether the object shall be interpreted as a road user or as an inanimate entity is made additionally on the basis of an analyzed infrared signature.

According to one embodiment, the method also comprises analyzing a light spectrum of the images acquired at different times, wherein the decision, via the device, whether the object concerned shall be interpreted as a road user or as an inanimate entity is made additionally on the basis of an analyzed light spectrum.

According to one embodiment, an outcome of the decision whether the object concerned shall be interpreted as a road user or as an inanimate entity, is transmitted to an autonomous-driving system such that the autonomous driving systems adapts vehicle control to match the outcome.

The disclosure also relates to a device that recognizes road users in the environment of a vehicle. A vehicle comprises at least one camera-based sensor that acquires images of a vehicle environment. The device is configured to perform a method, via control logic implementing the method, having the features described above. The device may be a controller, or microprocessor, to implement the method and adapt the autonomous driving system to match the outcome. With regard to advantages and preferred embodiments of the device, reference is made to the above embodiments relating to the method according to the disclosure.

The disclosure is described in greater detail below using exemplary embodiments with reference to the accompanying drawings, in which:

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
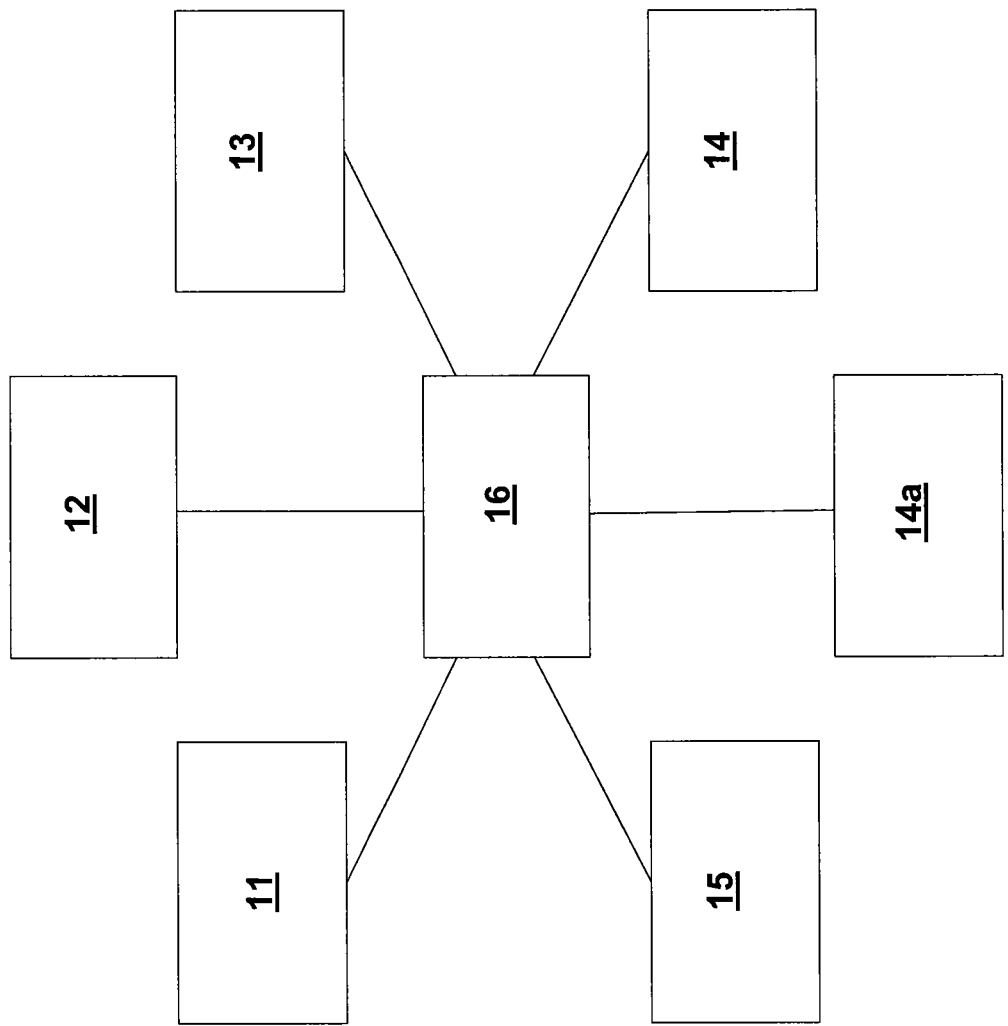
FIG. 1 shows a block diagram of control logic for communication between a device according to the disclosure and components of a vehicle.

FIG. 1 shows a block diagram that explains a design of a device according to the disclosure and interrelated functions of components of a vehicle and modules of the device.

According to FIG. 1, a camera sensor 11 is used to monitor road traffic and transmit images at a specific rate to a vehicle according to the disclosure. The camera sensor 11 is designed for autonomous driving.

A pedestrian recognition module 12 is used to detect pedestrians on the basis of image processing per se. The pedestrian recognition module transmits a position of a pedestrian relative to a vehicle designed for autonomous driving.

A memory module 13 is used to save, in a memory, over a specific, short time interval, an image sequence of at least one pedestrian detected by the pedestrian recognition module 12.

The device further includes a transformation module 14. The transformation module computes a similarity transformation. The transformation module 14 runs an algorithm for pairs of images that were saved in the memory module 13 at times "t" and "t+1" or "t+n", to ascertain whether an image acquired at time "t+1" or "t+n" can be obtained from an image acquired at time "t" by any combination of geometrical transformations listed below:

Stretching: a shape of the pedestrian is preserved subject to a scaling factor (enlargement or reduction).
Translation: a shape and size of the pedestrian are preserved, but a position of the pedestrian is changed.
Rotation: a shape of the pedestrian is changed, but angles and dimensions of the shape are preserved. The rotation can be with respect to a point or an axis (e.g. in the case of an advertisement on a bus that is making a turn).
Reflection (optional): a shape of the pedestrian is "reflected" with respect to an axis.

The similarity transformation can be performed in two dimensions or even in three-dimensional space.

Another module 14a is used to extract specific "markers" or features typical of advertisements or the like. This module 14a thus analyzes the images saved in the memory module 13 and attempts to extract specific features such as characters, letters or logos. The module 14a does this extraction of specific features by running a character recognition algorithm, or object recognition algorithm. In addition, a Cloud memory or Cloud server can be used that comprises, for instance, a collection of known company logos and known characters used in advertising, and, if applicable, a collection of known advertising images can also be accessed, whereby processing in the device, or controller or microprocessor, according to the disclosure can be made faster.

A search module 15 is used to apply a search described above that seeks a similarity transformation to consecutive pedestrian images that were saved in the memory module 13. If a suitable similarity transformation can be found for each image pair, the pedestrian is classified as a pedestrian who is not real (an "artificial" pedestrian). The classification of a pedestrian who is not real means that the device, or microprocessor that implements vehicle software to control systems that enable autonomous driving is not meant to consider this pedestrian as a "real pedestrian". In another embodiment, the search module 15 can also extract advertising markers to each pedestrian image. If a similarity transformation exists, and/or if any advertising marker has been identified, the pedestrian is classified as a pedestrian who is not real (an "artificial" pedestrian).

"16" is used to denote a central coordination unit 16 that coordinates the modules described above such that the device, or microprocessor, controls an autonomous driving system to control vehicle movements.

In another embodiment (not shown), the module 15 may be extended to an effect that the pedestrian who is artificial, or not real, may be a hologram, an animated image or an animated advertising surface. In this case, in a scenario in which a pedestrian image has been accepted initially as an image of a real pedestrian, one or more of the following analyses are performed:

According to one embodiment, an infrared signature of a pedestrian image can be analyzed using a suitable camera (this exploits a fact that a hologram, or a display, has a different signature from a living being). In addition, also a light spectrum of the pedestrian image can be analyzed in order to check whether a light signature matches that of an LED display. In addition, the light spectrum of the pedestrian image can also be analyzed in order to establish whether a frequency distribution and intensity distribution match those of an artificially generated image. As an option, a "ping signal" can also be transmitted to the pedestrian via a radar sensor or wireless communications in order to receive, if applicable, for instance a confirmation signal from a smartphone, or the like, that is being carried by a "real" pedestrian.

Figure 2:
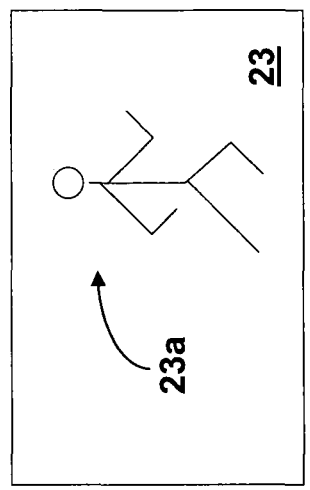
FIG. 2 shows a plurality of images of a traffic environment in front of a vehicle that are acquired using a camera.
Figure 2:
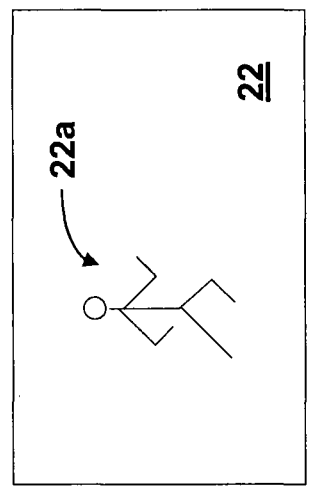
Figure 2:
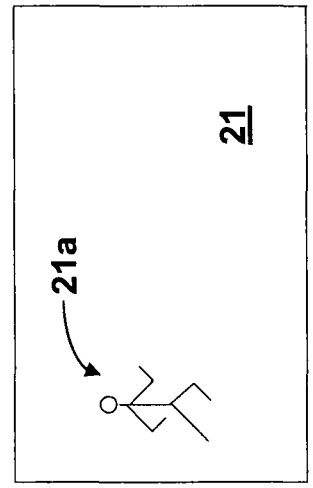

FIG. 2 shows, for the purpose of explaining a possible scenario arising when the method according to the disclosure is performed. A plurality of images 21, 22 and 23 of a traffic environment in front of a vehicle are acquired using a camera, as described above. In the example scenario, an assumption is that a vehicle is traveling around a left-hand bend. On a left-hand side of a road is a bus stop having an advertising surface visible from the vehicle. The advertising surface shows an image of a person running. The vehicle is equipped with a camera that provides suitable image signals for an autonomous-driving system to control vehicle movements based on the plurality of images on the advertising surface.

In the scenario described above, while the vehicle is turning to the left, the camera acquires, as shown in FIG. 2, a plurality of images 21, 22 and 23 of the traffic environment in front of the vehicle. As a result of the vehicle movement, the vehicle is located in a different position on the road during each image acquisition 21, 22, and 23. Consequently, a position and size of the advertising surface in the acquired images 21, 22 and 23 differ from one another. Hence in principle, a pedestrian 21a, 22a, 23a detected in these images 21, 22 and 23 in different forms can also be interpreted as a pedestrian who is running and intends to cross the road in front of the vehicle.

By virtue of the device according to the disclosure, the images 21, 22 and 23 are now saved, implementing the method in the modules as described above, and a similarity transformation is sought between images 21 and 22, and between images 22 and 23. In both cases, the device ascertains that the pedestrian 22a in image 22 can be obtained from the pedestrian 21a in image 21 (and the pedestrian 23a in image 23 can be obtained from the pedestrian 22a in image 22) by stretching by a scaling factor, and applying a translation. The device according to the disclosure therefore classifies the pedestrian as a pedestrian who is not real (an "artificial" pedestrian), and causes the algorithm or system for autonomous driving to ignore said "artificial" pedestrian when controlling vehicle movements via an autonomous driving system.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method that recognizes road users in an environment of a vehicle comprising:
    acquiring images, via a camera, of the vehicle environment and, at each of a plurality of different times, of an object located in the vehicle environment;
    controlling a vehicle movement according whether an object within the images is interpreted as a road user or as an inanimate entity according to image analyses performed on the images acquired at the different times, wherein performing image analyses includes checking whether the images acquired at different times exhibit at least one feature indicating an existence of an advertisement;
    performing the checking the images acquired at different times by accessing at least one database stored in a Cloud memory; and
    running at least one character recognition algorithm or object recognition algorithm during performing the checking of the images acquired at the different times.

2. The method as claimed in claim 1, wherein performing image analyses includes applying a similarity transformation to any two images of an object that are acquired at consecutive of the different times.

3. The method as claimed in claim 1 further comprising analyzing an infrared signature of the object, wherein the result is based on the infrared signature of the object.

4. The method as claimed in claim 1 further comprising analyzing a light spectrum of the images acquired at different times, wherein whether the object within the images is interpreted as a road user or as an inanimate entity is further based on the light spectrum.

5. The method as claimed in claim 1, wherein controlling a vehicle movement includes transmitting a result of whether the object within the images is interpreted as a road user or as an inanimate entity to an autonomous-driving system that controls vehicle components.

6. A vehicle autonomous driving system comprising:
    at least one camera-based sensor that acquires images of a vehicle environment; and
    a device configured to, in response to a result indicative of a road user or inanimate entity from an image analyses of an image acquired at each of a plurality of different times, via the at least one camera-based sensor, of an object located in the vehicle environment, control a vehicle movement according to the result, wherein the image analyses include a check of the image acquired at each of the plurality of different times of the object for at least one feature indicative of an advertisement, and wherein the check is performed via access to at least one database stored in a Cloud memory and the check runs at least one character recognition algorithm or object recognition algorithm.

7. The autonomous driving system as claimed in claim 6, wherein the result is based on an infrared signature of the object taken by the at least one camera-based sensor.

8. The autonomous driving system as claimed in claim 6, wherein the result is based a light spectrum of the images acquired at a plurality of different times taken by the at least one camera-based sensor.

9. A vehicle comprising:
an autonomous driving system having a camera that acquires images of an environment; and
a controller configured to, in response to a result indicative of a road user or inanimate entity from an image analyses of an image acquired at each of a plurality of different times, via the camera, of an object located in the vehicle environment, control, via the autonomous driving system, a vehicle movement according to the result, wherein the image analyses includes a check of the image acquired at each of the plurality of different times of the object for at least one feature indicative of an advertisement, and wherein the check is performed via access to at least one database stored in a Cloud memory and the check runs at least one character recognition algorithm or object recognition algorithm.

10. The vehicle as claimed in claim 9, wherein the image analyses include application of a similarity transformation to any two images of an object that are acquired at consecutive times.

11. The vehicle as claimed in claim 9, wherein the controller is configured to transmit the result to the autonomous driving system that controls vehicle components according to the result.

12. The vehicle as claimed in claim 9, wherein the result is based on an infrared signature of the object taken by the at least one camera-based sensor.

13. The vehicle as claimed in claim 9, wherein the result is based a light spectrum of the images acquired at a plurality of different times taken by the at least one camera-based sensor.

* * * * *